(12) United States Patent
Li (10) Patent No.: US 10,776,646 B2
(45) Date of Patent: Sep. 15, 2020

(54) IDENTIFICATION METHOD AND APPARATUS AND COMPUTER-READABLE STORAGE MEDIUM

(71) Applicant: Alibaba Group Holding Limited, George Town, Grand Cayman (KY)

(72) Inventor: Liang Li, Beijing (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/774,076

(22) Filed: Jan. 28, 2020

(65) Prior Publication Data

US 2020/0160078 A1 May 21, 2020

Related U.S. Application Data

(63) Continuation of application No. 16/537,026, filed on Aug. 9, 2019.

(30) Foreign Application Priority Data

Aug. 13, 2018 (CN) .......................... 2018 1 0917915

(51) Int. Cl.
*G06K 9/00* (2006.01)
*G06K 9/32* (2006.01)
*G06K 9/62* (2006.01)
*G06Q 20/40* (2012.01)

(52) U.S. Cl.
CPC ..... *G06K 9/00892* (2013.01); *G06K 9/00255* (2013.01); *G06K 9/00288* (2013.01); *G06K 9/00604* (2013.01); *G06K 9/00906* (2013.01); *G06K 9/3233* (2013.01); *G06K 9/6215* (2013.01); *G06Q 20/40145* (2013.01)

(58) Field of Classification Search
None
See application file for complete search history.

(56) References Cited

U.S. PATENT DOCUMENTS 6,181,805 B1 * 1/2001 Koike ................ G06K 9/00288
382/118
8,306,279 B2 * 11/2012 Hanna ................ G06K 9/00604
382/117
(Continued)

FOREIGN PATENT DOCUMENTS

CN   1618079 A   5/2005
CN   101833646 A   9/2010
(Continued)

OTHER PUBLICATIONS

Gottemukkula, Vikas. "Biometrics for smartphones using eyeprints." PhD diss., University of Missouri-Kansas City, 2014. (Year: 2014).*
(Continued)

*Primary Examiner* — Feng Niu
(74) *Attorney, Agent, or Firm* — Finnegan, Henderson, Farabow, Garrett & Dunner, L.L.P.

(57) ABSTRACT

An identification method includes: controlling at least one camera to acquire a face image and an eye image of a target object, wherein the eye image includes at least one of an iris feature or an eye-print feature; and identifying the target object based on the face image and the eye image.

17 Claims, 4 Drawing Sheets

(56) References Cited

U.S. PATENT DOCUMENTS

| | | | |
|---|---|---|---|
| 8,565,493 B2* | 10/2013 | Ryu | G06K 9/00281 |
| | | | 382/115 |
| 8,761,458 B2* | 6/2014 | Bazakos | G06K 9/00261 |
| | | | 382/117 |
| 8,818,051 B2* | 8/2014 | Hoyos | G06K 9/00107 |
| | | | 382/117 |
| 8,818,052 B2* | 8/2014 | Hoyos | G06K 9/00107 |
| | | | 382/117 |
| 9,025,830 B2* | 5/2015 | Ma | G06K 9/00221 |
| | | | 382/107 |
| 9,355,299 B2* | 5/2016 | Hoyos | G06K 9/00107 |
| 9,940,575 B2* | 4/2018 | Hsiao | G06F 16/5838 |
| 10,268,952 B2* | 4/2019 | Hsiao | G06F 16/5838 |
| 10,437,972 B2* | 10/2019 | Tang | G06F 21/32 |
| 10,467,490 B2* | 11/2019 | He | H04L 63/0861 |
| 10,599,912 B2* | 3/2020 | Benini | G06K 9/00597 |
| 2003/0144034 A1* | 7/2003 | Hack | H04M 1/0268 |
| | | | 455/566 |
| 2007/0036398 A1* | 2/2007 | Chen | G06K 9/00288 |
| | | | 382/118 |
| 2008/0317349 A1* | 12/2008 | Ishikawa | G06Q 20/40145 |
| | | | 382/190 |
| 2011/0187845 A1* | 8/2011 | Bazakos | G06K 9/00604 |
| | | | 348/78 |
| 2012/0314913 A1* | 12/2012 | Bedros | G06K 9/4623 |
| | | | 382/117 |
| 2014/0086450 A1* | 3/2014 | Huang | G06K 9/00295 |
| | | | 382/103 |
| 2016/0357748 A1* | 12/2016 | Hsiao | G06N 3/0427 |
| 2017/0140212 A1* | 5/2017 | Lo | G06K 9/6206 |
| 2018/0239954 A1* | 8/2018 | Hamada | G06K 9/00281 |
| 2018/0302786 A1* | 10/2018 | Yu | H04W 12/08 |
| 2019/0019015 A1* | 1/2019 | Tang | G06K 9/00597 |
| 2019/0019024 A1* | 1/2019 | Zhou | G06K 9/00302 |
| 2019/0019046 A1* | 1/2019 | Zhou | G06K 9/6215 |
| 2019/0026576 A1* | 1/2019 | Zhang | G06K 9/00288 |
| 2019/0251380 A1* | 8/2019 | Park | G06K 9/6228 |
| 2020/0050877 A1* | 2/2020 | Li | G06K 9/00604 |

FOREIGN PATENT DOCUMENTS

| | | |
|---|---|---|
| CN | 104239857 A | 12/2014 |
| CN | 104992163 A | 10/2015 |
| CN | 105262758 A | 1/2016 |
| CN | 105320941 A | 2/2016 |
| CN | 105760820 A | 7/2016 |
| CN | 105912987 A | 8/2016 |
| CN | 105913019 A | 8/2016 |
| CN | 106096585 A | 11/2016 |
| CN | 106203297 A | 12/2016 |
| CN | 106203375 A | 12/2016 |
| CN | 106250851 A | 12/2016 |
| CN | 106529436 A | 3/2017 |
| CN | 106548132 A | 3/2017 |
| CN | 106899567 A | 6/2017 |
| CN | 107239735 A | 10/2017 |
| CN | 107273812 A | 10/2017 |
| CN | 107346419 A | 11/2017 |
| CN | 107368725 A | 11/2017 |
| CN | 107392192 A | 11/2017 |
| CN | 107451455 A | * 12/2017 |
| CN | 107451455 A | 12/2017 |
| CN | 107506696 A | 12/2017 |
| CN | 107580114 A | 1/2018 |

OTHER PUBLICATIONS

International Search Report and Written Opinion dated Dec. 13, 2019, in counterpart International Application No. PCT/US2019/045891.

Lu Chengxue, Bohong Information Technology Co., Ltd., *Discussion on living body detection technology in face authentication application*, Financial Computer of China, 2017, Issue 8, 3 pgs.

* cited by examiner

100

```
┌─────────────────────────────────────┐
│ Control at least one camera to acquire a face image │
│ and an eye image of a target object, wherein the eye │ ─── 110
│ image includes at least one of an iris feature or an │
│           eye-print feature          │
└─────────────────────────────────────┘
                    │
                    │
┌─────────────────────────────────────┐
│ Identify the target object based on the face image and │ ─── 120
│              the eye image           │
└─────────────────────────────────────┘
```

IDENTIFICATION METHOD AND APPARATUS AND COMPUTER-READABLE STORAGE MEDIUM

CROSS-REFERENCE TO RELATED APPLICATIONS

This application is a continuation of U.S. applicantion Ser. No. 16/537,026, filed on Aug. 9, 2019, which is based upon and claims priority to Chinese Application No. 201810917915.7, filed on Aug. 13, 2018, the entire content of all of which is incorporated herein by reference.

TECHNICAL FIELD

The specification relates generally to the field of computer technologies and, more particularly, to an identification method, and apparatus and computer-readable storage medium.

TECHNICAL BACKGROUND

With the development of communication technologies and the popularization of electronic payment, people conduct transactions increasingly by electronic payment (such as payment by Alipay™) instead of cash.

Currently, it is common to use terminals such as mobile phones to complete electronic payment. However, terminals such as mobile phones generally use a payment password for identification or verification during electronic payment. Once a user's mobile phone and payment password are stolen at the same time, the user will suffer economic losses. Therefore, how to better identify a user when the user makes a transaction by electronic payment is a technical problem to be solved.

SUMMARY

An identification method, apparatus and computer-readable storage medium are provided in the embodiments of this specification to better identify a user.

According to a first aspect, an identification method includes: controlling at least one camera to acquire a face image and an eye image of a target object, wherein the eye image includes at least one of an iris feature or an eye-print feature; and identifying the target object based on the face image and the eye image.

According to a second aspect, an identification apparatus includes: an acquisition module configured to acquire a face image and an eye image of a target object through at least one camera, wherein the eye image includes at least one of an iris feature or an eye-print feature; and an identification module configured to identify the target object based on the face image and the eye image.

According to a third aspect, an identification device includes: a processor; and a memory configured to store instructions executable by the processor, wherein the processor is configured to: control at least one camera to acquire a face image and an eye image of a target object, wherein the eye image includes at least one of an iris feature or an eye-print feature; and identify the target object based on the face image and the eye image.

According to a fourth aspect, a computer-readable storage medium has stored thereon instructions that, when executed by a processor of a device, cause the device to perform an identification method, the identification method including: controlling at least one camera to acquire a face image and an eye image of a target object, wherein the eye image includes at least one of an iris feature or an eye-print feature; and identifying the target object based on the face image and the eye image.

At least one of the above technical solutions used in the embodiments of this specification can achieve the following beneficial effects.

In the embodiments of this specification, a face image and an eye image of a target object are acquired, and the target object is identified based on at least one of an iris feature or an eye-print feature in the eye image. Because the target object is verified using multiple factors by combining the face image with the at least one of the iris feature or the eye-print feature in the eye image, a user can be better identified.

DETAILED DESCRIPTION

Embodiments of this specification are described below with reference to the accompanying drawings. The described embodiments are merely examples, rather than all of the embodiments consistent with the specification. Based on the described embodiments, all other embodiments obtained by those with ordinary skill in the art without creative efforts belong to the protection scope of the specification.

In the embodiments, facial recognition is a biometric recognition technology for identification based on human facial feature information, also commonly referred to as portrait recognition, face recognition.

In the embodiments, iris is a circular part between the black pupil and the white sclera in the eye, including detail features such as many intersecting spots, thin threads, coronas, stripes, and crypts. The iris remains unchanged over one's entire life course after fetal development. These features determine the uniqueness of the iris feature, and also determine the uniqueness of identification. Therefore, the iris feature of the eye can be used as an identifying object of each person.

In the embodiments, eye-print refers to blood vessels, stripes, and other subtle features in the white part of the eye (sclera). Studies show that these detailed features remain unchanged over a long time, and the eye-print feature is unique to each person. Even identical multiples have different eye-prints.

In the embodiments, liveness detection refers to detecting whether a biometric signal obtained by a sensor is from a real living human body. For human face liveness detection, liveness detection technologies are mainly used to ensure that a human face image acquired by a camera comes from the face of a living body, rather than a photo, video, human face mask, or the like.

The technical solutions according to the embodiments of the specification are described in detail below with reference to the accompanying drawings.

The identification method according to the embodiments of this specification can be widely applied in various scenarios, such as payment scenarios, medical scenarios, passenger scenarios, and the like.

Figure 1:
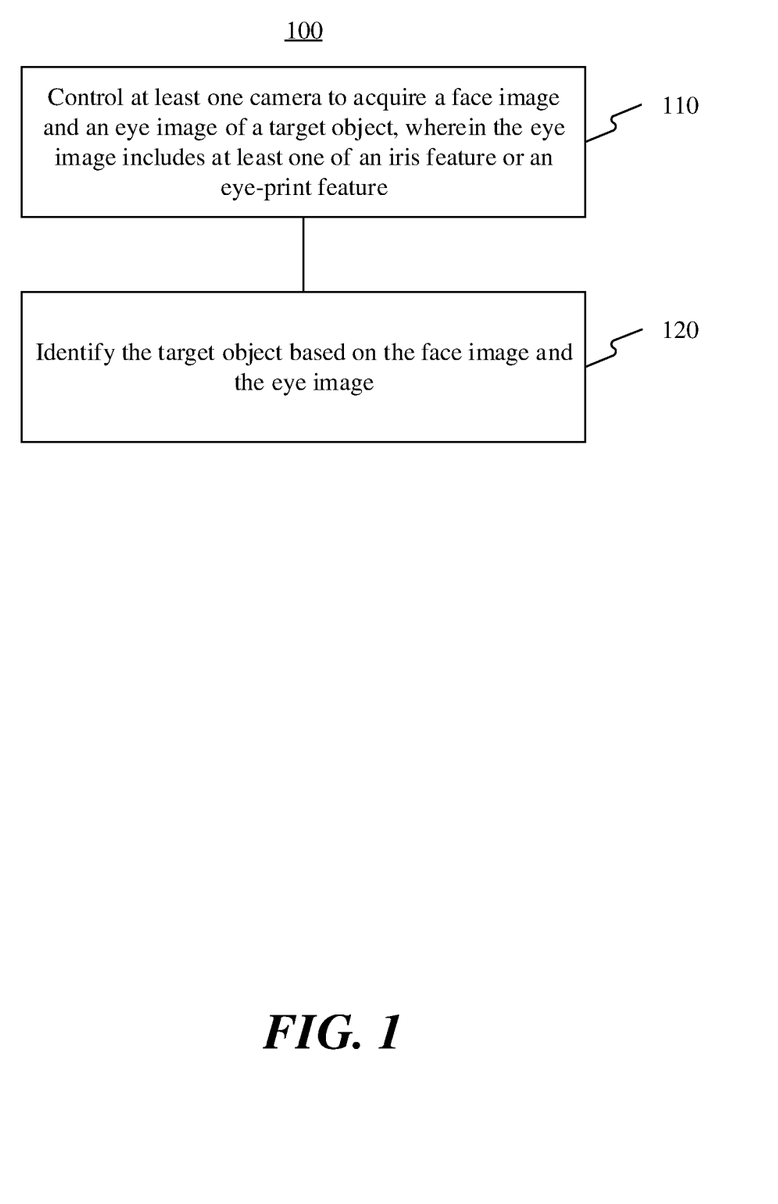
FIG. 1 is a flowchart of an identification method according to an embodiment.

FIG. 1 is a flowchart of an identification method 100 according to an embodiment. Referring to FIG. 1, the identification method 100 may include the following steps.

In step 110, at least one camera is controlled to acquire a face image and an eye image of a target object, wherein the eye image includes at least one of an iris feature or an eye-print feature.

The target object is an object to be identified, and it may be a human being, an animal, or the like. For example, when user A needs to be identified, user A may stand in front of a machine to wait for a camera to acquire a face image and an eye image of user A. In this case, user A is the target object.

In step 120, the target object is identified based on the face image and the eye image.

In one embodiment, the target object may be identified based on the face image and the iris feature in the eye image. In another embodiment, the target object may be identified based on the face image and the eye-print feature in the eye image.

In another embodiment, the target object may be identified based on the face image as well as the iris feature and the eye-print feature in the eye image.

In the embodiments of this specification, a face image and an eye image of a target object are acquired, and the target object is identified based on at least one of an iris feature or an eye-print feature in the eye image. Because the target object is verified using multiple factors by combining the face image with at least one of the iris feature or the eye-print feature in the eye image, a user can be better identified.

In the embodiments of this specification, the face image and the eye image may be acquired by one camera or by two cameras. In the case of one camera, the face image and the eye image of the target object may be acquired by the same camera. In the case of two cameras, the face image of the target object may be acquired by one camera, and the eye image of the target object may be acquired by the other camera.

In the embodiments of this specification, at least one camera can be controlled in various manners to acquire the face image and the eye image of the target object. The manners are described in the following with examples.

In some embodiments, the face image and the eye image are acquired by using rectangular frames. A facial rectangular frame may be used during acquisition of the face image, and a two-eye rectangular frame may be used during acquisition of the eye image. The facial rectangular frame is a rectangular frame outlining the face of the target object, and the two-eye rectangular frame includes rectangular frames outlining the two eyes of the target object, that is, a left-eye rectangular frame and a right-eye rectangular frame. Rectangular frames can be used for alignment with various parts of a body. Therefore, a clear face image and a clear eye image can be obtained when rectangular frames are used for image acquisition, thereby facilitating subsequent identification.

In one embodiment, the face image and the eye image may be acquired separately. For example, the face image of the target object is acquired first, and then the eye image of the target object is acquired. In this embodiment, the step of acquiring a face image and an eye image of a target object may include: adjusting the at least one camera to acquire the face image of the target object; and adjusting the at least one camera based on the position of a facial rectangular frame of the face image to acquire the eye image of the target object. In this manner, the face image and the eye image of the target object can be acquired quickly by using a facial rectangular frame when the target object does not cooperate.

In the specification, adjusting the camera may be adjusting imaging parameters of the camera, such as a focal length, orientation, exposure time, and the like. An objective of adjusting the camera is to obtain a face image or an eye image of higher resolution and clarity.

When there is one camera, the step of adjusting the at least one camera to acquire the face image of the target object may include: adjusting the camera to obtain the position of the facial rectangular frame of the target object; and acquiring the face image of the target object based on the position of the facial rectangular frame. Correspondingly, the step of adjusting the at least one camera based on the position of a facial rectangular frame of the face image to acquire the eye image of the target object may include: adjusting the camera based on the position of the facial rectangular frame of the face image to obtain the position of a two-eye rectangular frame of the target object; and acquiring the eye image of the target object based on the position of the two-eye rectangular frame.

In other words, in the case of one camera, the camera can be adjusted to obtain the face image and the eye image of the target object sequentially. Because the face image and the eye image are acquired based on the facial rectangular frame and the two-eye rectangular frame in this process, the high quality of the acquired images can be ensured. At the same time, when the target object does not cooperate during image acquisition, the face image and the eye image can also be obtained quickly by adjusting the camera and using rectangular frames (including the facial rectangular frame and the two-eye rectangular frame).

When the number of cameras is two, one of the at least one camera may be a first camera for photographing a face, and the other camera may be a second camera for photographing eyes. In this case, the step of adjusting the at least one camera to acquire the face image of the target object may include: adjusting the first camera to obtain the position of the facial rectangular frame of the target object; and acquiring the face image of the target object based on the position of the facial rectangular frame. Correspondingly, the step of adjusting the at least one camera based on the position of a facial rectangular frame of the face image to acquire the eye image of the target object may include: adjusting the second camera based on the position of the facial rectangular frame to obtain the position of a two-eye rectangular frame of the target object; and acquiring the eye image of the target object based on the position of the two-eye rectangular frame.

In the case of two cameras, the face image and the eye image of the target object may be obtained by adjusting the two cameras. In an embodiment, the face image and the eye image are acquired by special cameras. Therefore, images with higher quality than those in the case of one camera can be obtained. Because the face image and the eye image are acquired based on the facial rectangular frame and the two-eye rectangular frame in the image acquisition process, the high quality of the acquired images can be ensured. At the same time, when the target object does not cooperate during image acquisition, the face image and the eye image can also be obtained quickly by adjusting the cameras and using rectangular frames (including the facial rectangular frame and the two-eye rectangular frame).

In another embodiment, the face image and the eye image can be acquired simultaneously. In this embodiment, the step of acquiring a face image and an eye image of a target object may include: adjusting the at least one camera to obtain the position of an initial facial rectangular frame of the target object; and adjusting the at least one camera based on the position of the initial facial rectangular frame to acquire the face image and the eye image of the target object. In other words, in this case, the face image is not acquired when the initial facial rectangular frame appears; instead, the camera is further adjusted to ensure that the face image and the eye image are acquired simultaneously only when the eye image and the face image are both clear enough.

In the case of one camera, the step of adjusting the at least one camera based on the position of the initial facial rectangular frame to acquire the face image and the eye image of the target object may include: adjusting the camera based on the position of the initial facial rectangular frame to obtain the position of a target facial rectangular frame of the target object and the position of a two-eye rectangular frame of the target object; and acquiring the face image of the target object based on the position of the target facial rectangular frame, and acquiring the eye image of the target object based on the position of the two-eye rectangular frame.

In the case of one camera, by adjusting the camera continuously, the face image and the eye image are acquired only when the facial rectangular frame and the two-eye rectangular frame appear at the same time. As such, it can be ensured that the acquired face image and eye image are associated at the same moment.

In the case of two cameras, the at least one camera includes a first camera for photographing a face and a second camera for photographing eyes, and the step of adjusting the at least one camera to obtain the position of an initial facial rectangular frame of the target object may include: adjusting the first camera to obtain the position of the initial facial rectangular frame of the target object. Correspondingly, the step of adjusting the at least one camera based on the position of the initial facial rectangular frame to acquire the face image and the eye image of the target object may include: adjusting the first camera based on the position of the initial facial rectangular frame to obtain the position of a target facial rectangular frame of the target object, and acquiring the face image of the target object based on the position of the target facial rectangular frame; adjusting the second camera based on the position of the target facial rectangular frame to obtain the position of a two-eye rectangular frame of the target object; and acquiring the eye image of the target object based on the position of the two-eye rectangular frame.

In the case of two cameras, the face image and the eye image of the target object can be obtained by adjusting the two cameras. In an embodiment, the face image and the eye image are acquired by special cameras. Therefore, images with higher quality than those in the case of one camera can be obtained. Because the face image and the eye image are acquired based on the facial rectangular frame and the two-eye rectangular frame in the image acquisition process, high quality of the acquired images can be ensured. At the same time, when the target object does not cooperate during image acquisition, the face image and the eye image can also be obtained quickly by adjusting the cameras and using rectangular frames (including the facial rectangular frame and the two-eye rectangular frame).

In some embodiments, the face image and the eye image are acquired without using rectangular frames. In an embodiment, the camera may be adjusted continuously to ensure that the eye image and the face image are clear enough. During camera adjustment, similar to the foregoing cases, the face image and the eye image may be acquired separately or simultaneously. When the face image and the eye image are acquired simultaneously, the images are generally required to be of high quality.

It should be understood that the above descriptions are merely examples of image acquisition methods, which are not intended to be limiting.

It should also be understood that in the embodiments of this specification, the face may be detected first during the process of determining the facial rectangular frame. In some embodiments, the face detection method may be a conventional method based on Haar features and a boost classifier, or a deep learning method based on a transient chaotic neural network (TCNN). The position of the facial rectangular frame may be the imaging coordinate position of the facial rectangular frame, and the position of the two-eye rectangular frame may be the imaging coordinate position of the two-eye rectangular frame.

Figure 2:
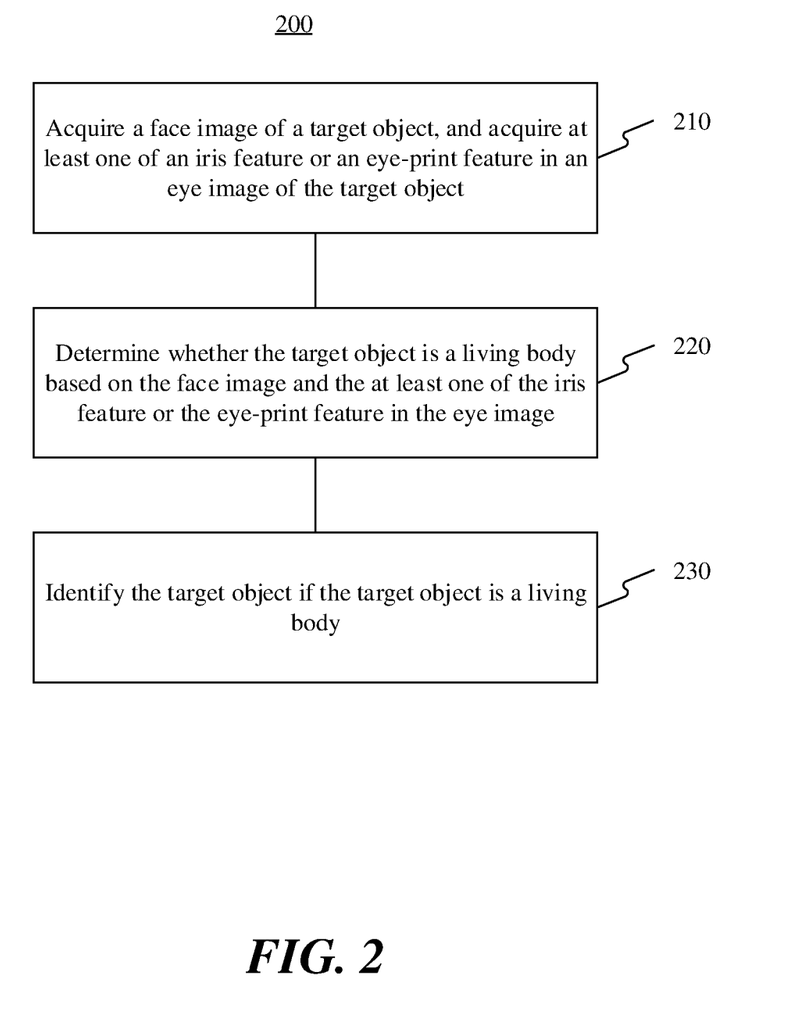
FIG. 2 is a flowchart of an identification method according to another embodiment.

FIG. 2 is a flowchart of an identification method 200 according to an embodiment. Referring to FIG. 2, the identification method 200 may include the following steps.

In step 210, a face image of a target object is acquired, and at least one of an iris feature or eye-print feature in an eye image of the target object is acquired.

In step 220, it is determined whether the target object is a living body based on the face image and the at least one of the iris feature or the eye-print feature in the eye image.

The face image may be a single-frame face image or a multi-frame face image. The eye image may be a single-frame eye image or a multi-frame eye image.

If the face image is a single-frame face image, and the eye image is a single-frame eye image, step 220 of determining whether the target object is a living body based on the eye image and the face image may include: determining whether the target object is a living body based on a difference between a single-frame face image of a living body and a single-frame face image of a non-living body, and a difference between at least one of the iris feature or the eye-print feature included in a single-frame eye image of a living body and the at least one of the iris feature or the eye-print feature included in a single-frame eye image of a non-living body.

In the case of a single-frame face image, the face of a non-living body may have distortions, flaws, or the like. Therefore, by determining whether the face displayed in the single-frame face image has any distortions or flaws, it can be determined whether the target object is a living body. For example, if a single-frame face image has phenomena such as distortions and flaws, it can be directly determined that the target object is a non-living body (for example, a face in a video); if a face displayed in a single-frame face image is intact and has phenomena such as distortions and flaws, the target object can be determined to be a living body, or further detection may be performed in combination with at least one of the iris feature or the eye-print feature.

In the case of a single-frame eye image, detail features on the iris (such as spots, thin threads, coronas, stripes, and crypts) or detail features on the eye-print (such as blood vessels and stripes) may be detected to determine whether the target object is a living body. For example, if the eye image includes detail features on the iris or detail features on the eye-print, it can be determined that the target object is a living body; if the eye image does not include detail features on the iris or detail features on the eye-print, it can be determined that the target object is a non-living body.

In the embodiments of this specification, the face image and the eye image may be used in combination, and it is determined whether the target object is a living body by judging the face image and the eye image.

If the face image is a multi-frame face image, and the eye image is a multi-frame eye image, step 220 of determining whether the target object is a living body based on the eye image and the face image includes: determining that the target object is a living body if there are differences among the multiple frames of the face image; determining that the target object is a living body if there are differences among the multiple frames of the eye image in terms of the iris feature or the eye-print feature; and determining that the target object is a non-living body if there is no difference between the multiple frames of the eye image in terms of the iris feature or the eye-print feature.

When the face image and the eye image have multiple frames, the multiple frames of the face image may be compared with each other to determine whether the target object is a living body, and meanwhile, the multiple frames of the eye image are also compared with each other to determine whether the target object is a living body. If there is no difference between the multiple frames of the eye image, it can be determined that the target object is a non-living body. Of course, to ensure stringency, the target object may be determined as a non-living body when there is no difference between the multiple frames of the face image and there is also no difference between the multiple frames of the eye image. If there are differences among the multiple frames of the face image or among the multiple frames of the eye image, it can be determined that the target object is a living body.

In step 230, the target object is identified if the target object is a living body.

In the embodiments of this specification, a face image and an eye image of a target object are acquired, and the target object is identified based on at least one of an iris feature or an eye-print feature in the eye image. Because the target object is verified using multiple factors by combining the face image with at least one of the iris feature or the eye-print feature in the eye image, a user can be better identified. Meanwhile, before identification of the target object, it is first determined whether the target object is a living body, and identification is performed only when the target object is a living body, thereby ensuring the validity of the identification, preventing others from passing identification using a stolen video or a picture.

In the embodiments of this specification, multiple modes may be used for identification. For example, at least one of a face image, the iris feature in an eye image, or the eye-print feature in an eye image may be used for identification. In other words, identification can be performed by combining a face image with the iris feature in an eye image, by combining a face image with the eye-print feature in an eye image, or by using a face image, the iris feature in an eye image, and the eye-print feature in an eye image. Identification may also be performed by combining the iris feature in an eye image with the eye-print feature in an eye image. The following describes examples of various identification modes.

First identification mode: identification based on a face image and the iris feature of an eye image.

In one embodiment of this specification, the eye image may include an iris feature, and in this case, the identifying the target object in step 120 or step 230 may include: comparing the acquired face image with face images in a face image library; selecting a first group of face images from the face image library, the first group of face images being face images whose similarities with the acquired face image are greater than a first threshold; further comparing the iris feature of the acquired eye image with iris features of specified eye images in an eye image library, wherein the specified eye images are associated with the face images in the first group of face images; and identifying the target object successfully if the similarity between an iris feature of an eye image in the eye image library and the iris feature of the acquired eye image is greater than a second threshold.

This identification mode based on a face image and the iris feature of an eye image can ensure highly precise identification and has a high identification speed.

Second identification mode: identification based on a face image and the eye-print feature of an eye image.

In one embodiment of this specification, the eye image comprises an eye-print feature, and the identifying the target object in step 120 or step 230 may include: comparing the acquired face image with face images in a face image library; selecting a first group of face images from the face image library, the first group of face images being face images whose similarities with the acquired face image are greater than a first threshold; further comparing the eye-print feature of the acquired eye image with eye-print features of specified eye images in an eye image library, wherein the specified eye images are associated with the face images in the first group of face images; and identifying the target object successfully if the similarity between an eye-print feature of an eye image in the eye image library and the eye-print feature of the acquired eye image is greater than a third threshold.

This identification mode based on a face image and the eye-print feature of an eye image can ensure highly precise identification and has a high identification speed.

Third identification mode: identification based on a face image, the iris feature of an eye image, and the eye-print feature of an eye image.

In one embodiment of this specification, the eye image includes an iris feature and an eye-print feature, and the identifying the target object in step 120 or step 230 includes: comparing the acquired face image with face images in a face image library; selecting a first group of face images from the face image library, the first group of face images being face images whose similarities with the acquired face image are greater than a first threshold; further comparing the iris feature of the acquired eye image with iris features of specified eye images in an eye image library, wherein the specified eye images are associated with the face images in the first group of face images; selecting a first group of eye images from the specified eye images, the first group of eye images being eye images having iris features whose similarities with the iris feature of the acquired eye image are greater than a second threshold in the specified eye images; comparing the eye-print feature of the acquired eye image with eye-print features of the eye images in the first group of eye images; and identifying the target object successfully if the similarity between an eye-print feature of an eye image in the first group of eye images and the eye-print feature of the acquired eye image is greater than a third threshold.

This identification mode based on a face image, the iris feature of an eye image, and the eye-print feature of an eye image can ensure highly precise identification and effectively avoid false identification.

Fourth identification mode: identification based on a face image, the eye-print feature of an eye image, and the iris feature of an eye image.

In one embodiment of this specification, the eye image includes an iris feature and an eye-print feature, and the identifying the target object in step 120 or step 230 includes: comparing the acquired face image with face images in a face image library; selecting a first group of face images from the face image library, the first group of face images being face images whose similarities with the acquired face image are greater than a first threshold; further comparing the eye-print feature of the acquired eye image with eye-print features of specified eye images in an eye image library, wherein the specified eye images are associated with the face images in the first group of face images; selecting a second group of eye images from the specified eye images, the second group of eye images being eye images having eye-print features whose similarities with the eye-print feature of the acquired eye image are greater than a third threshold in the specified eye images; comparing the iris feature of the acquired eye image with iris features of the eye images in the second group of eye images; and identifying the target object successfully if the similarity between an iris feature of an eye image in the second group of eye images and the iris feature of the acquired eye image is greater than a second threshold.

This identification mode based on a face image, the eye-print feature of an eye image, and the iris feature of an eye image can ensure highly precise identification and effectively avoid false identification.

Fifth identification mode: identification based on the iris feature of an eye image and a face image.

In one embodiment of this specification, the eye image includes an iris feature, and the identifying the target object in step 120 or step 230 includes: comparing the iris feature of the acquired eye image with iris features of eye images in an eye image library; selecting a third group of eye images from the eye image library, the third group of eye images being eye images having iris features whose similarities with the iris feature of the acquired eye image are greater than a second threshold; comparing the acquired face image with specified face images in a face image library, wherein the specified face images are associated with the eye images in the third group of eye images; and identifying the target object successfully if the similarity between a face image in the specified face images and the acquired face image is greater than a first threshold.

This identification mode based on the iris feature of an eye image and a face image has high precision.

Sixth identification mode: identification based on the eye-print feature of an eye image and a face image.

In one embodiment of this specification, the eye image includes an eye-print feature, and the identifying the target object in step 120 or step 230 includes: comparing the eye-print feature of the acquired eye image with eye-print features of eye images in an eye image library; selecting a fourth group of eye images from the eye image library, the fourth group of eye images being eye images having eye-print features whose similarities with the eye-print feature of the acquired eye image are greater than a third threshold; comparing the acquired face image with specified face images in a face image library, wherein the specified face images are associated with the eye images in the fourth group of eye images; and identifying the target object successfully if the similarity between a face image in the specified face images and the acquired face image is greater than a first threshold.

This identification mode based on the eye-print feature of an eye image and a face image has high precision.

Seventh identification mode: identification based on the iris feature of an eye image, the eye-print feature of an eye image, and a face image.

In one embodiment of this specification, the eye image includes an iris feature and an eye-print feature, and the identifying the target object in step 120 or step 230 includes: comparing the iris feature of the acquired eye image with iris features of eye images in an eye image library; selecting a third group of eye images from the eye image library, the third group of eye images being eye images having iris features whose similarities with the iris feature of the acquired eye image are greater than a second threshold; comparing the eye-print feature of the acquired eye image with eye-print features of the eye images in the third group of eye images; selecting a fifth group of eye images from the third group of eye images, the fifth group of eye images being eye images having eye-print features whose similarities with the eye-print feature of the acquired eye image are greater than a third threshold; comparing the acquired face image with specified face images in a face image library, wherein the specified face images are associated with the fifth group of eye images; and identifying the target object successfully if the similarity between a face image in the specified face images and the acquired face image is greater than a first threshold.

This identification mode based on the iris feature of an eye image, the eye-print feature of an eye image, and a face image can ensure highly precise identification and effectively avoid false identification.

Eighth identification mode: identification based on the eye-print feature of an eye image, the iris feature of an eye image, and a face image.

In one embodiment of this specification, the eye image includes an iris feature and an eye-print feature, and the identifying the target object in step 120 or step 230 includes: comparing the eye-print feature of the acquired eye image with eye-print features of eye images in an eye image library; selecting a fourth group of eye images from the eye image library, the fourth group of eye images being face images having eye-print features whose similarities with the eye-print feature of the acquired eye image are greater than a third threshold; comparing the iris feature of the acquired eye image with iris features of the eye images in the fourth group of eye images; selecting a sixth group of eye images from the fourth group of eye images, the sixth group of eye images being eye images having iris features whose similarities with the iris feature of the acquired eye image are greater than a second threshold; comparing the acquired face image with specified face images in a face image library, wherein the specified face images are associated with the sixth group of eye images; and identifying the target object successfully if the similarity between a face image in the specified face images and the acquired face image is greater than a first threshold.

This identification mode based on the eye-print feature of an eye image, the iris feature of an eye image, and a face image can ensure highly precise identification and effectively avoid false identification.

It should be noted that in the various identification modes above, the eye image library and the face image library can be obtained locally or from other storage apparatuses. Eye images in the eye image library may be obtained in advance in various manners, and face images in the face image library may also be obtained in advance in various manners. Specific acquisition manners are not limited in this application.

Meanwhile, it should be noted that in the various identification modes above, the first threshold, the second threshold, and the third threshold may be set as required. The first threshold may be set to 70 points (100 points in total) or 70%, for example; the first threshold may be set to 72 points or 72%, for example; and the third threshold may be set to 75 points or 75% for example. There is no association among the values of the first threshold, the second threshold, and the third threshold.

The identification method in the embodiments can combine face, eye-print, and iris technologies, and the technologies can be applied to non-cooperative identification of users in a face-scanning payment scenario, thereby not only combining face-based and eye-print-based liveness detection technologies, but also using faces, irises, and eye-prints in large-scale user retrieval. Moreover, retrieval can be implemented in a cascaded manner, thus balancing efficiency and accuracy, and achieving rapid retrieval from a database including millions of faces within a short period of time (such as 1 second).

Figure 3:
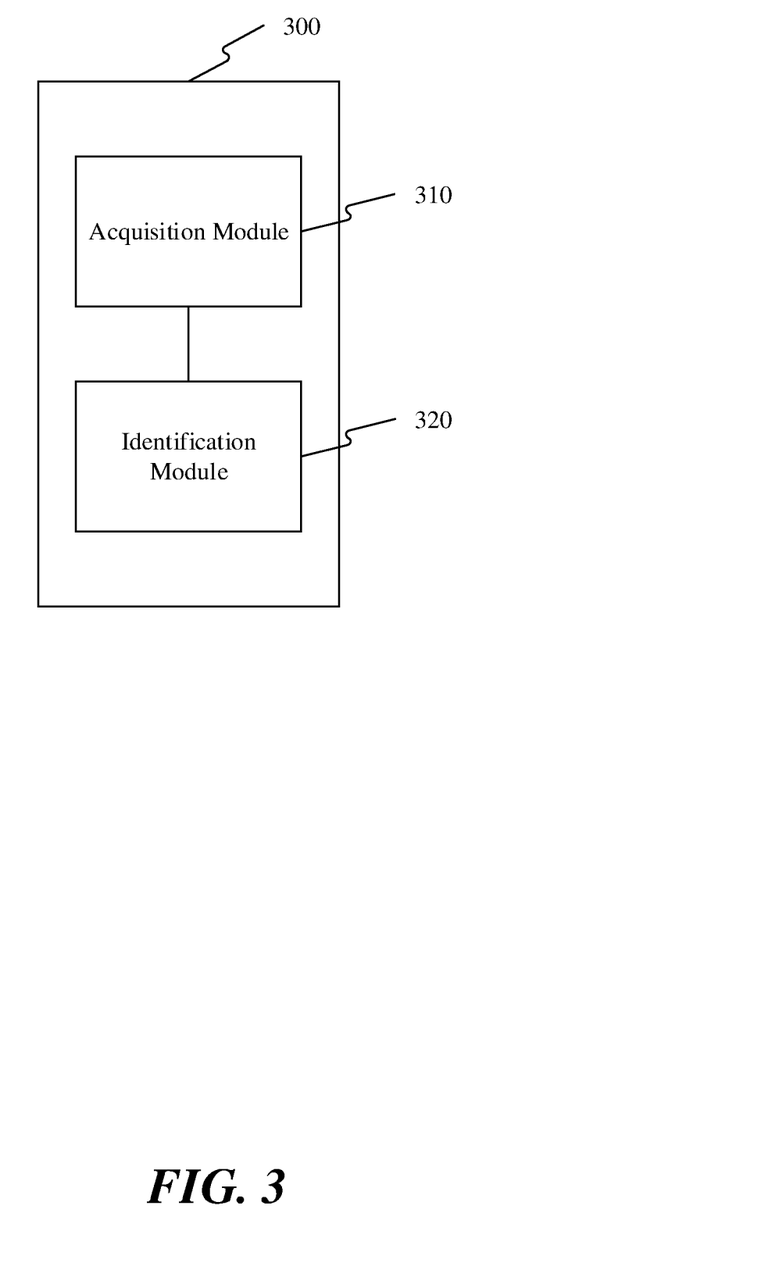
FIG. 3 is a block diagram of an identification apparatus according to an embodiment.

FIG. 3 is a block diagram of an identification apparatus 300 according to an embodiment. Referring to FIG. 3, the identification apparatus 300 may include an acquisition module 310 and an identification module 320. Here:

The acquisition module 310 is configured to acquire a face image and an eye image of a target object through at least one camera, wherein the eye image includes at least one of an iris feature or an eye-print feature.

The identification module 320 is configured to identify the target object based on the face image and the eye image.

In one embodiment, the identification module 320 is configured to: determine whether the target object is a living body based on the eye image and the face image; and identify the target object if the target object is a living body.

In one embodiment, the acquisition module 310 is configured to: adjust the at least one camera to acquire the face image of the target object; and adjust the at least one camera based on the position of a facial rectangular frame of the face image to acquire the eye image of the target object.

In one embodiment, the at least one camera is one camera, and the acquisition module 310 is configured to: adjust the camera to obtain the position of the facial rectangular frame of the target object; acquire the face image of the target object based on the position of the facial rectangular frame; adjust the camera based on the position of the facial rectangular frame of the face image to obtain the position of a two-eye rectangular frame of the target object; and acquire the eye image of the target object based on the position of the two-eye rectangular frame.

In one embodiment, the at least one camera includes a first camera for photographing a face and a second camera for photographing eyes, and the acquisition module 310 is configured to: adjust the first camera to obtain the position of the facial rectangular frame of the target object; acquire the face image of the target object based on the position of the facial rectangular frame; adjust the second camera based on the position of the facial rectangular frame to obtain the position of a two-eye rectangular frame of the target object; and acquire the eye image of the target object based on the position of the two-eye rectangular frame.

In one embodiment, the acquisition module 310 is configured to: adjust the at least one camera to obtain the position of an initial facial rectangular frame of the target object; and adjust the at least one camera based on the position of the initial facial rectangular frame to acquire the face image and the eye image of the target object.

In one embodiment, the at least one camera is one camera, and the acquisition module 310 is configured to: adjust the camera based on the position of the initial facial rectangular frame to obtain the position of a target facial rectangular frame of the target object and the position of a two-eye rectangular frame of the target object; and acquire the face image of the target object based on the position of the target facial rectangular frame, and acquire the eye image of the target object based on the position of the two-eye rectangular frame.

In one embodiment, the at least one camera includes a first camera for photographing a face and a second camera for photographing eyes, and the acquisition module 310 is configured to: adjust the first camera to obtain the position of the initial facial rectangular frame of the target object; adjust the first camera based on the position of the initial facial rectangular frame to obtain the position of a target facial rectangular frame of the target object, and acquire the face image of the target object based on the position of the target facial rectangular frame; adjust the second camera based on the position of the target facial rectangular frame to obtain the position of a two-eye rectangular frame of the target object; and acquire the eye image of the target object based on the position of the two-eye rectangular frame.

In one embodiment, the face image is a single-frame face image, the eye image is a single-frame eye image, and the identification module 320 is configured to: determine whether the target object is a living body based on a difference between a single-frame face image of a living body and a single-frame face image of a non-living body, and a difference between at least one of the iris feature or the eye-print feature included in a single-frame eye image of a living body and the at least one of the iris feature or the eye-print feature included in a single-frame eye image of a non-living body.

In one embodiment, the face image is a multi-frame face image, the eye image is a multi-frame eye image, and the identification module 320 is configured to: determine that the target object is a living body if there are differences among the multiple frames of the face image; determine that the target object is a living body if there are differences among the multiple frames of the eye image in terms of the iris feature or the eye-print feature; and determine that the target object is a non-living body if there is no difference between the multiple frames of the eye image in terms of the iris feature or the eye-print feature.

In one embodiment, the eye image includes an iris feature, and the identification module 320 is configured to: compare the acquired face image with face images in a face image library; select a first group of face images from the face image library, the first group of face images being face images whose similarities with the acquired face image are greater than a first threshold; further comparing the iris feature of the acquired eye image with iris features of specified eye images in an eye image library, wherein the specified eye images are associated with the face images in the first group of face images; and identify the target object successfully if the similarity between an iris feature of an eye image in the eye image library and the iris feature of the acquired eye image is greater than a second threshold.

In one embodiment, the eye image includes an eye-print feature, and the identification module 320 is configured to: compare the acquired face image with face images in a face image library; select a first group of face images from the face image library, the first group of face images being face images whose similarities with the acquired face image are greater than a first threshold; further compare the eye-print feature of the acquired eye image with eye-print features of specified eye images in an eye image library, wherein the specified eye images are associated with the face images in the first group of face images; and identify the target object successfully if the similarity between an eye-print feature of an eye image in the eye image library and the eye-print feature of the acquired eye image is greater than a third threshold.

In one embodiment, the eye image includes an iris feature and an eye-print feature, and the identification module 320 is configured to: compare the acquired face image with face images in a face image library; select a first group of face images from the face image library, the first group of face images being face images whose similarities with the acquired face image are greater than a first threshold; further compare the iris feature of the acquired eye image with iris features of specified eye images in an eye image library, wherein the specified eye images are associated with the face images in the first group of face images; select a first group of eye images from the specified eye images, the first group of eye images being eye images having iris features whose similarities with the iris feature of the acquired eye image are greater than a second threshold in the specified eye images; compare the eye-print feature of the acquired eye image with eye-print features of the eye images in the first group of eye images; and identify the target object successfully if the similarity between an eye-print feature of an eye image in the first group of eye images and the eye-print feature of the acquired eye image is greater than a third threshold.

In one embodiment, the eye image includes an iris feature and an eye-print feature, and the identification module 320 is configured to: compare the acquired face image with face images in a face image library; select a first group of face images from the face image library, the first group of face images being face images whose similarities with the acquired face image are greater than a first threshold; further compare the eye-print feature of the acquired eye image with eye-print features of specified eye images in an eye image library, wherein the specified eye images are associated with the face images in the first group of face images; select a second group of eye images from the specified eye images, the second group of eye images being eye images having eye-print features whose similarities with the eye-print feature of the acquired eye image are greater than a third threshold in the specified eye images; compare the iris feature of the acquired eye image with iris features of the eye images in the second group of eye images; and identify the target object successfully if the similarity between an iris feature of an eye image in the second group of eye images and the iris feature of the acquired eye image is greater than a second threshold.

In one embodiment, the eye image includes an iris feature, and the identification module 320 is configured to: compare the iris feature of the acquired eye image with iris features of eye images in an eye image library; select a third group of eye images from the eye image library, the third group of eye images being eye images having iris features whose similarities with the iris feature of the acquired eye image are greater than a second threshold; compare the acquired face image with specified face images in a face image library, wherein the specified face images are associated with the eye images in the third group of eye images; and identify the target object successfully if the similarity between a face image in the specified face images and the acquired face image is greater than a first threshold.

In one embodiment, the eye image includes an eye-print feature, and the identification module 320 is configured to: compare the eye-print feature of the acquired eye image with eye-print features of eye images in an eye image library; select a fourth group of eye images from the eye image library, the fourth group of eye images being eye images having eye-print features whose similarities with the eye-print feature of the acquired eye image are greater than a third threshold; compare the acquired face image with specified face images in a face image library, wherein the specified face images are associated with the eye images in the fourth group of eye images; and identify the target object successfully if the similarity between a face image in the specified face images and the acquired face image is greater than a first threshold.

In one embodiment, the eye image includes an iris feature and an eye-print feature, and the identification module 320 is configured to: compare the iris feature of the acquired eye image with iris features of eye images in an eye image library; select a third group of eye images from the eye image library, the third group of eye images being eye images having iris features whose similarities with the iris feature of the acquired eye image are greater than a second threshold; compare the eye-print feature of the acquired eye image with eye-print features of the eye images in the third group of eye images; select a fifth group of eye images from the third group of eye images, the fifth group of eye images being eye images having eye-print features whose similarities with the eye-print feature of the acquired eye image are greater than a third threshold; compare the acquired face image with specified face images in the face image library, wherein the specified face images are associated with the fifth group of eye images; and identify the target object successfully if the similarity between a face image in the specified face images and the acquired face image is greater than a first threshold.

In one embodiment, the eye image includes an iris feature and an eye-print feature, and the identification module 320 is configured to: compare the eye-print feature of the acquired eye image with eye-print features of eye images in an eye image library; select a fourth group of eye images from the eye image library, the fourth group of eye images being face images having eye-print features whose similarities with the eye-print feature of the acquired eye image are greater than a third threshold; compare the iris feature of the acquired eye image with iris features of the eye images in the fourth group of eye images; selecting a sixth group of eye images from the fourth group of eye images, the sixth group of eye images being eye images having iris features whose similarities with the iris feature of the acquired eye image are greater than a second threshold; compare the acquired face image with specified face images in the face image library, wherein the specified face images are associated with the sixth group of eye images; and identify the target object successfully if the similarity between a face image in the specified face images and the acquired face image is greater than a first threshold.

In the embodiments of this specification, a face image and an eye image of a target object are acquired, and the target object is identified based on at least one of an iris feature or an eye-print feature in the eye image. Because the target object is verified using multiple factors by combining the face image with at least one of the iris feature or the eye-print feature in the eye image, a user can be better identified.

Figure 4:
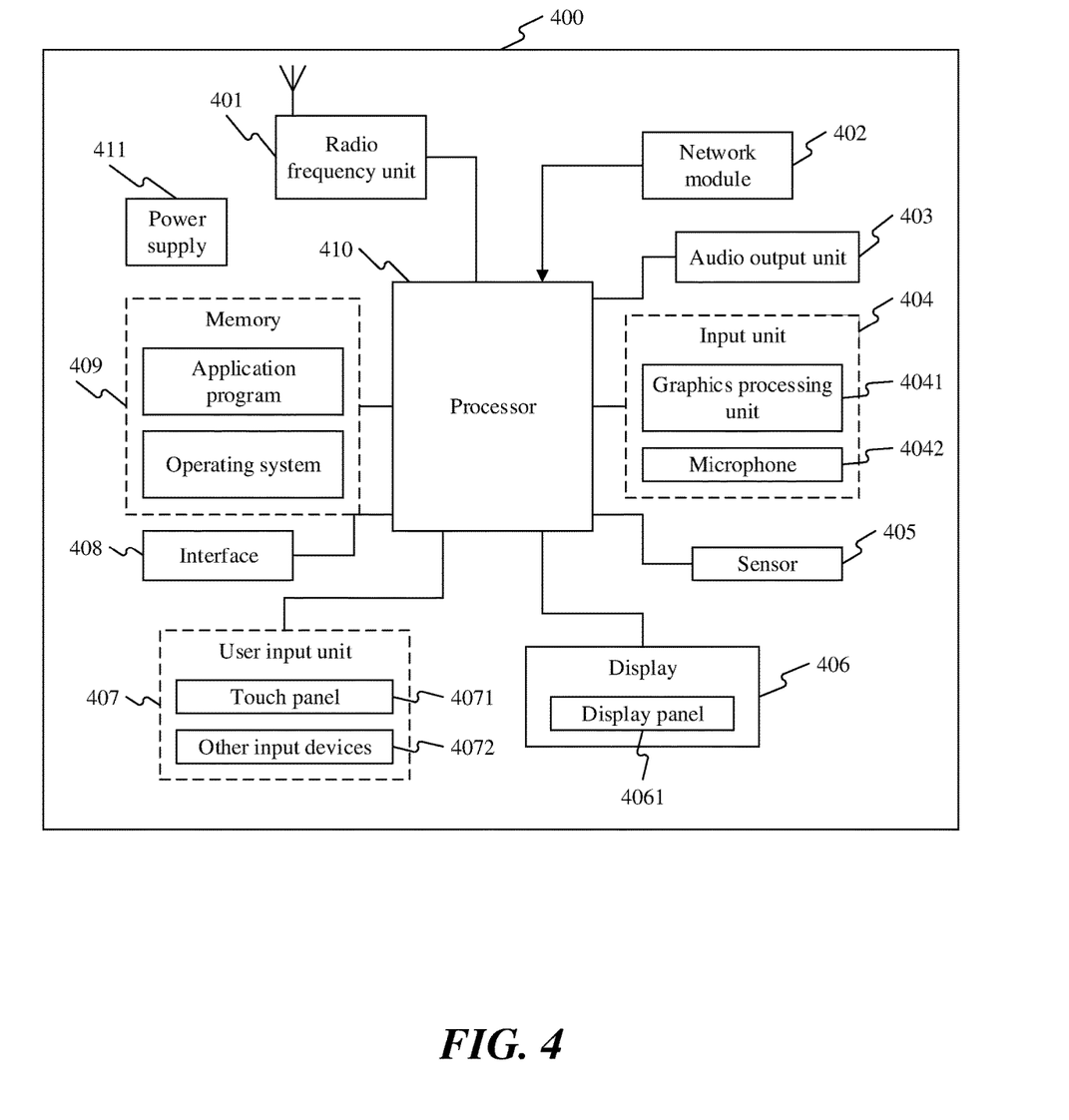
FIG. 4 is a schematic diagram of a terminal according to an embodiment.

FIG. 4 is a schematic diagram of a terminal 400 for implementing the above described methods, according to an embodiment. For example, the terminal 400 may be a mobile terminal.

The terminal 400 includes, but is not limited to, components such as a radio frequency unit 401, a network module 402, an audio output unit 403, an input unit 404, a sensor 405, a display 406, a user input 407, an interface 408, a memory 409, a processor 410, and a power supply 411. Those skilled in the art can understand that the structure of the terminal 400 shown in FIG. 4 does not limit the terminal. The terminal 400 may include more or fewer components than those shown in FIG. 4, or some components may be combined, or a different component deployment may be used. In the embodiments of this specification, the terminal 400 includes, but is not limited to, a mobile phone, a tablet computer, a notebook computer, a palmtop computer, a vehicle-mounted terminal, a wearable device, a pedometer, and the like.

The processor 410 is configured to generate prompt information, wherein the prompt information includes a sending location, an amount, and prompt information content; search for another mobile terminal within a preset range of the sending location according to the sending location; and send the prompt information to the another mobile terminal.

In the embodiment, the terminal 400 can generate prompt information, wherein the prompt information includes a sending location, an amount, and prompt information content; search for another mobile terminal within a preset range of the sending location according to the sending location; and send the prompt information to the another mobile terminal. The prompt information can be sent anonymously, thereby avoiding the problem of conflicts that occur in face-to-face communication and achieving a notification function, improving safety. Moreover, a small amount of money is attached to the prompt information, which can also attract the attention of the audience, and it is more likely to achieve the information transfer objective.

The radio frequency unit 401 may be configured to send and receive information or place a call. For example, the receiving and sending of signals involves receiving downlink data from a base station, and then sending it to the processor 410 for processing. In addition, uplink data is sent to the base station. Generally, the radio frequency unit 401 includes, but is not limited to, an antenna, at least one amplifier, a transceiver, a coupler, a low noise amplifier, a duplexer, and the like. In addition, the radio frequency unit 401 may also communicate with a network and other devices through a wireless communication system.

The terminal 400 provides wireless broadband Internet access for the user through the network module 402, for example, helping the user send and receive emails, browse webpages, access streaming media, and the like.

The audio output unit 403 can convert audio data, which is received by the radio frequency unit 401 or the network module 402 or stored in the memory 409, into an audio signal and output the audio signal as sound. Moreover, the audio output unit 403 can further provide an audio output (such as a calling reception sound, a message reception sound, and the like) related to a specific function performed by the terminal 400. The audio output unit 403 includes a loudspeaker, a buzzer, a telephone receiver, and the like.

The input unit 404 is configured to receive audio or video signals. The input unit 404 may include a Graphics Processing Unit (GPU) 4041 and a microphone 4042. The GPU 4041 processes a static picture or image data of a video obtained by an image capture apparatus (such as a camera) in a video capture mode or an image capture mode. A processed image frame may be displayed on the display unit 406. Image frames processed by the GPU 4041 may be stored in the memory 409 (or other storage media) or sent through the radio frequency unit 401 or the network module 402. The microphone 4042 can receive sound and can process the sound to be audio data. The processed audio data may be converted, in telephone call mode, into a format that can be sent to a mobile communication base station through the radio frequency unit 401, and output.

The sensor 405 may be, e.g., an optical sensor, a motion sensor, and other sensors. For example, the optical sensor includes an ambient light sensor and a proximity sensor. The ambient light sensor can adjust the luminance of a display panel 4061 according to brightness of the ambient light, and the proximity sensor can switch off the display panel 4061 and/or backlight when the terminal 400 is moved to the ear. As a type of motion sensor, an acceleration sensor can detect the magnitude of accelerations in various directions (generally along three axes), can detect the magnitude and direction of gravity when static, and can be used in functions related to recognizing the attitude of the terminal 400 (such as switching between landscape mode and portrait mode, related games, and magnetometer attitude calibrations) and vibration identification (such as a pedometer and tapping). The sensor 405 may include a fingerprint sensor, a pressure sensor, an iris sensor, a molecule sensor, a gyroscope, a barometer, a hygrometer, a thermometer, an infrared sensor, and the like, which are not described in detail here.

The display 406 is configured to display information input by the user or provide information for the user. The display 406 may include a display panel 4061. The display panel 4061 may be configured in the form of a Liquid Crystal Display (LCD), an Organic Light-Emitting Diode (OLED), or the like.

The user input unit 407 may be configured to receive input digital or character information and generate key signal input related to the user settings and function control of the terminal 400. For example, the user input unit 407 includes a touch panel 4071 and other input devices 4072. The touch panel 4071, also referred to as a touch screen, can collect a touch operation by the user on or near the touch panel (such as an operation by the user on or near the touch panel 4071 using any suitable object or attachment, such as a finger or a stylus). The touch panel 4071 may include two parts: a touch detection apparatus and a touch controller. The touch detection apparatus detects the direction of the user's touch, detects a signal generated by the touch operation, and sends the signal to the touch controller. The touch controller receives touch information from the touch detection apparatus, converts it into touch-point coordinates, sends the coordinates to the processor 410, and receives and executes a command sent by the processor 410. In addition, the touch panel 4071 may be implemented as various types, such as a resistive type, a capacitance type, an infrared type, a surface acoustic wave type, and the like. In addition to the touch panel 4071, the user input unit 407 may further include other input devices 4072. For example, the other input devices 4072 may include, but are not limited to, a physical keyboard, a functional key (such as a volume control key, a switch key, and the like), a track ball, a mouse, and a joystick, which are not described in detail here.

Further, the touch panel 4071 may cover the display panel 4061. After detecting a touch operation thereon or nearby, the touch panel 4071 transmits the touch operation to the processor 410 to determine the type of touch event. Then, the processor 410 provides a corresponding visual output on the display panel 4061 according to the type of touch event. Although the touch panel 4071 and the display panel 4061 are implemented as two independent parts in FIG. 4 to achieve the input and output functions of the terminal 400, in some embodiments, the touch panel 4071 and the display panel 4061 may be integrated to achieve the input and output functions of the terminal 400, which is not specifically limited here.

The interface 408 is an interface for connecting an external apparatus to the terminal 400. The external apparatus may be a wired or wireless headset port, an external power supply (or battery charger) port, a wired or wireless data port, a memory card port, a port for connection to an apparatus having a recognition module, an audio input/output (I/O) port, a visual I/O port, an earphone port, and the like. The interface 408 may be configured to receive input (such as data information, electric power, and the like) from the external apparatus, and transmit the received input to one or more components in the terminal 400, or configured to transmit data between the terminal 400 and the external apparatus.

The memory 409 may be configured to store software programs and various data. The memory 409 may primarily comprise a program storage area and a data storage area. The program storage area can store an operating system, an application program required by at least one function (for example, a sound playing function, an image display function, and the like), etc. The data storage area can store data (such as audio data and an address book) created according to use of the mobile phone, and the like. The memory 409 may include a high-speed random access memory, and may also include a non-volatile memory, for example, at least one magnetic disk storage device, a flash storage device, or other volatile solid-state storage devices.

The processor 410 is the control center of the terminal 400 and connects various parts of the terminal 400 by using various interfaces and lines. By running or executing a software program and/or module stored in the memory 409, and invoking data stored in the memory 409, the processor 410 performs various functions of the terminal 400 and processes data, thereby performing overall monitoring of the terminal 400. The processor 410 may include one or more processing units. In an embodiment, the processor 410 may integrate an application processor and a modem processor. The application processor mainly processes operating systems, user interfaces, application programs, and the like. The modem processor mainly processes wireless communication. It can be understood that the modem processor may not be integrated into the processor 410.

The terminal 400 may further include a power supply 411 (such as a battery) supplying power to various components. In an embodiment, the power supply 411 may be logically connected to the processor 410 through a power supply management system, thereby implementing functions such as charging management, discharging management, and power consumption management by using the power supply management system.

In addition, the terminal 400 may include some functional modules not shown, which are not described in detail here.

In an embodiment, a mobile terminal includes a processor 410, a memory 409, and a computer program that is stored in the memory 409 and operable on the processor 410. When the computer program is executed by the processor 410, the mobile terminal performs the above described identification method, and the same technical effect can be achieved.

An embodiment of this specification further provides a non-transitory computer-readable storage medium has stored thereon instructions that, when executed by a processor of a device, cause the device to perform the above described identification method, and the same technical effect can be achieved. The computer-readable storage medium is, for example, a Read-Only Memory (ROM), a Random Access Memory (RAM), a magnetic disk, an optical disc, or the like.

The identification apparatus and terminal described above can combine the face, eye-print, and iris technologies, and the technologies can be applied to identification of non-cooperative users in a face-scanning payment scenario, thereby not only combining face-based and eye-print-based liveness detection technologies, but also using faces, irises, and eye-prints in large-scale user retrieval. Moreover, the retrieval can be implemented in a cascaded manner, thus balancing efficiency and accuracy, and achieving rapid retrieval from a database including millions of faces within a short period of time (such as 1 second).

It should be noted that, the terms "include," "comprise" or any other variations thereof are intended to cover a non-exclusive inclusion, so that a process, method, article or apparatus including a series of elements not only includes those elements, but also includes other elements not expressly listed, or further includes elements inherent to the process, method, article, or apparatus. In the absence of more limitations, an element defined by "including a/an . . . " does not exclude the presence of other, similar elements in the process, method, article or apparatus including the element.

Each of the above described modules and units may be implemented as software, or hardware, or a combination of software and hardware. For example, each of the above described modules and units may be implemented using a processor executing instructions stored in a memory. Also, for example, each of the above described modules and units may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Specific embodiments of this specification are described above. Other embodiments fall within the scope of the appended claims. In some cases, the actions or steps described in the claims may be performed in a sequence different from the sequence in the embodiment and still achieve the expected result. In addition, the processes depicted in the drawings do not necessarily require the specific sequence shown or a consecutive sequence to achieve the expected result. In some implementations, multi-task processing and parallel processing are also possible or may be advantageous.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. An identification method, comprising:
controlling at least one camera to acquire a face image and an eye image of a target object, wherein the eye image comprises at least one of an iris feature or an eye-print feature;

performing a liveness detection on the target object based on the eye image and the face image; and identifying the target object if the target object is detected to be a living body, wherein the face image includes multiple frames, the eye image includes multiple frames, and the performing the liveness detection on the target object based on the eye image and the face image comprises:

determining that the target object is a living body if there are differences among the multiple frames of the face image;

determining that the target object is a living body if there are differences among the multiple frames of the eye image in terms of at least one of the iris feature or the eye-print feature; and determining that the target object is a non-living body if there is no difference between the multiple frames of the eye image in terms of the iris feature and the eye-print feature.

2. The method of claim 1, wherein the controlling at least one camera to acquire a face image and an eye image of a target object comprises:

adjusting the at least one camera to acquire the face image of the target object; and adjusting the at least one camera based on a position of a facial rectangular frame of the face image to acquire the eye image of the target object.

3. The method of claim 2, wherein the at least one camera is one camera, the adjusting the at least one camera to acquire the face image of the target object comprises: adjusting the camera to obtain the position of the facial rectangular frame of the target object; and acquiring the face image of the target object based on the position of the facial rectangular frame; and the adjusting the at least one camera based on a position of a facial rectangular frame of the face image to acquire the eye image of the target object comprises: adjusting the camera based on the position of the facial rectangular frame of the face image to obtain a position of a two-eye rectangular frame of the target object; and acquiring the eye image of the target object based on the position of the two-eye rectangular frame.

4. The method of claim 2, wherein the at least one camera comprises a first camera for photographing a face and a second camera for photographing eyes, the adjusting the at least one camera to acquire the face image of the target object comprises: adjusting the first camera to obtain the position of the facial rectangular frame of the target object; and acquiring the face image of the target object based on the position of the facial rectangular frame; and the adjusting the at least one camera based on the position of a facial rectangular frame of the face image to acquire the eye image of the target object comprises: adjusting the second camera based on the position of the facial rectangular frame to obtain a position of a two-eye rectangular frame of the target object; and acquiring the eye image of the target object based on the position of the two-eye rectangular frame.

5. The method of claim 1, wherein the controlling at least one camera to acquire a face image and an eye image of a target object comprises:

adjusting the at least one camera to obtain a position of an initial facial rectangular frame of the target object; and adjusting the at least one camera based on the position of the initial facial rectangular frame to acquire the face image and the eye image of the target object.

6. The method of claim 5, wherein the at least one camera is one camera, and the adjusting the at least one camera based on the position of the initial facial rectangular frame to acquire the face image and the eye image of the target object comprises:

adjusting the camera based on the position of the initial facial rectangular frame to obtain a position of a target facial rectangular frame of the target object and a position of a two-eye rectangular frame of the target object; and acquiring the face image of the target object based on the position of the target facial rectangular frame, and acquiring the eye image of the target object based on the position of the two-eye rectangular frame.

7. The method of claim 5, wherein the at least one camera comprises a first camera for photographing a face and a second camera for photographing eyes, the adjusting the at least one camera to obtain a position of an initial facial rectangular frame of the target object comprises: adjusting the first camera to obtain the position of the initial facial rectangular frame of the target object; and the adjusting the at least one camera based on the position of the initial facial rectangular frame to acquire the face image and the eye image of the target object comprises: adjusting the first camera based on the position of the initial facial rectangular frame to obtain a position of a target facial rectangular frame of the target object, and acquiring the face image of the target object based on the position of the target facial rectangular frame; adjusting the second camera based on the position of the target facial rectangular frame to obtain a position of a two-eye rectangular frame of the target object; and acquiring the eye image of the target object based on the position of the two-eye rectangular frame.

8. The method of claim 1, wherein the eye image comprises an iris feature, and the identifying the target object comprises:

comparing the acquired face image with face images in a face image library;

selecting a first group of face images from the face image library, the first group of face images being face images whose similarities with the acquired face image are greater than a first threshold;

further comparing the iris feature of the acquired eye image with iris features of specified eye images in an eye image library, wherein the specified eye images are associated with the face images in the first group of face images; and identifying the target object successfully if a similarity between an iris feature of an eye image in the eye image library and the iris feature of the acquired eye image is greater than a second threshold.

9. The method of claim 1, wherein the eye image comprises an eye-print feature, and the identifying the target object comprises:

comparing the acquired face image with face images in a face image library;

selecting a first group of face images from the face image library, the first group of face images being face images whose similarities with the acquired face image are greater than a first threshold;

further comparing the eye-print feature of the acquired eye image with eye-print features of specified eye images in an eye image library, wherein the specified eye images are associated with the face images in the first group of face images; and identifying the target object successfully if a similarity between an eye-print feature of an eye image in the eye image library and the eye-print feature of the acquired eye image is greater than a third threshold.

10. The method of claim 1, wherein the eye image comprises an iris feature and an eye-print feature, and the identifying the target object comprises:

comparing the acquired face image with face images in a face image library;

selecting a first group of face images from the face image library, the first group of face images being face images whose similarities with the acquired face image are greater than a first threshold;

further comparing the iris feature of the acquired eye image with iris features of specified eye images in an eye image library, wherein the specified eye images are associated with the face images in the first group of face images;

selecting a first group of eye images from the specified eye images, the first group of eye images being eye images having iris features whose similarities with the iris feature of the acquired eye image are greater than a second threshold in the specified eye images;

comparing the eye-print feature of the acquired eye image with eye-print features of the eye images in the first group of eye images; and identifying the target object successfully if a similarity between an eye-print feature of an eye image in the first group of eye images and the eye-print feature of the acquired eye image is greater than a third threshold.

11. The method of claim 1, wherein the eye image comprises an iris feature and an eye-print feature, and the identifying the target object comprises:

comparing the acquired face image with face images in a face image library;

selecting a first group of face images from the face image library, the first group of face images being face images whose similarities with the acquired face image are greater than a first threshold;

further comparing the eye-print feature of the acquired eye image with eye-print features of specified eye images in an eye image library, wherein the specified eye images are associated with the face images in the first group of face images;

selecting a second group of eye images from the specified eye images, the second group of eye images being eye images having eye-print features whose similarities with the eye-print feature of the acquired eye image are greater than a third threshold in the specified eye images;

comparing the iris feature of the acquired eye image with iris features of the eye images in the second group of eye images; and identifying the target object successfully if a similarity between an iris feature of an eye image in the second group of eye images and the iris feature of the acquired eye image is greater than a second threshold.

12. The method of claim 1, wherein the eye image comprises an iris feature, and the identifying the target object comprises:

comparing the iris feature of the acquired eye image with iris features of eye images in an eye image library;

selecting a third group of eye images from the eye image library, the third group of eye images being eye images having iris features whose similarities with the iris feature of the acquired eye image are greater than a second threshold;

comparing the acquired face image with specified face images in a face image library, wherein the specified face images are associated with the eye images in the third group of eye images; and identifying the target object successfully if a similarity between a face image in the specified face images and the acquired face image is greater than a first threshold.

13. The method of claim 1, wherein the eye image comprises an eye-print feature, and the identifying the target object comprises:

comparing the eye-print feature of the acquired eye image with eye-print features of eye images in an eye image library;

selecting a fourth group of eye images from the eye image library, the fourth group of eye images being eye images having eye-print features whose similarities with the eye-print feature of the acquired eye image are greater than a third threshold;

comparing the acquired face image with specified face images in a face image library, wherein the specified face images are associated with the eye images in the fourth group of eye images; and identifying the target object successfully if a similarity between a face image in the specified face images and the acquired face image is greater than a first threshold.

14. The method of claim 1, wherein the eye image comprises an iris feature and an eye-print feature, and the identifying the target object comprises:

comparing the iris feature of the acquired eye image with iris features of eye images in an eye image library;

selecting a third group of eye images from the eye image library, the third group of eye images being eye images having iris features whose similarities with the iris feature of the acquired eye image are greater than a second threshold;

comparing the eye-print feature of the acquired eye image with eye-print features of the eye images in the third group of eye images;

selecting a fifth group of eye images from the third group of eye images, the fifth group of eye images being eye images having eye-print features whose similarities with the eye-print feature of the acquired eye image are greater than a third threshold;

comparing the acquired face image with specified face images in a face image library, wherein the specified face images are associated with the fifth group of eye images; and identifying the target object successfully if a similarity between a face image in the specified face images and the acquired face image is greater than a first threshold.

15. The method of claim 1, wherein the eye image comprises an iris feature and an eye-print feature, and the identifying the target object comprises:

comparing the eye-print feature of the acquired eye image with eye-print features of eye images in an eye image library;

selecting a fourth group of eye images from the eye image library, the fourth group of eye images being face images having eye-print features whose similarities with the eye-print feature of the acquired eye image are greater than a third threshold;

comparing the iris feature of the acquired eye image with iris features of the eye images in the fourth group of eye images;

selecting a sixth group of eye images from the fourth group of eye images, the sixth group of eye images being eye images having iris features whose similarities with the iris feature of the acquired eye image are greater than a second threshold;

comparing the acquired face image with specified face images in a face image library, wherein the specified face images are associated with the sixth group of eye images; and identifying the target object successfully if a similarity between a face image in the specified face images and the acquired face image is greater than a first threshold.

16. An identification device, comprising:

a processor; and a memory configured to store instructions executable by the processor, wherein the processor is configured to:

control at least one camera to acquire a face image and an eye image of a target object, wherein the eye image comprises at least one of an iris feature or an eye-print feature;

perform a liveness detection on the target object based on the eye image and the face image; and identify the target object if the target object is detected to be a living body, wherein the face image includes multiple frames, the eye image includes multiple frames, and performing the liveness detection on the target object based on the eye image and the face image comprises:

determining that the target object is a living body if there are differences among the multiple frames of the face image;

determining that the target object is a living body if there are differences among the multiple frames of the eye image in terms of at least one of the iris feature or the eye-print feature; and determining that the target object is a non-living body if there is no difference between the multiple frames of the eye image in terms of the iris feature and the eye-print feature.

17. A computer-readable storage medium having stored thereon instructions that, when executed by a processor of a device, cause the device to perform an identification method, the identification method comprising:

controlling at least one camera to acquire a face image and an eye image of a target object, wherein the eye image comprises at least one of an iris feature or an eye-print feature;

performing a liveness detection on the target object based on the eye image and the face image; and identifying the target object if the target object is detected to be a living body, wherein the face image includes multiple frames, the eye image includes multiple frames, and the performing the liveness detection on the target object based on the eye image and the face image comprises:

determining that the target object is a living body if there are differences among the multiple frames of the face image;

determining that the target object is a living body if there are differences among the multiple frames of the eye image in terms of at least one of the iris feature or the eye-print feature; and determining that the target object is a non-living body if there is no difference between the multiple frames of the eye image in terms of the iris feature and the eye-print feature.

\* \* \* \* \*